United States Patent
Rossetti et al.

(10) Patent No.: US 10,686,608 B2
(45) Date of Patent: Jun. 16, 2020

(54) SECURE, PLATFORM-INDEPENDENT CODE SIGNING

(71) Applicant: Red Hat, Inc., Raleigh, NC (US)

(72) Inventors: Leonardo Rossetti, Sao Paulo (BR); Leigh Griffin, Waterford City (IE)

(73) Assignee: Red Hat, Inc., Raleigh, NC (US)

( * ) Notice: Subject to any disclaimer, the term of this patent is extended or adjusted under 35 U.S.C. 154(b) by 292 days.

(21) Appl. No.: 15/905,255

(22) Filed: Feb. 26, 2018

(65) Prior Publication Data
US 2019/0268164 A1  Aug. 29, 2019

(51) Int. Cl.
*H04L 29/06* (2006.01)
*H04L 9/32* (2006.01)
*H04L 29/08* (2006.01)

(52) U.S. Cl.
CPC ........ *H04L 9/3247* (2013.01); *H04L 67/1097* (2013.01)

(58) Field of Classification Search
CPC .......................... H04L 9/3247; H04L 67/1097
See application file for complete search history.

(56) References Cited

U.S. PATENT DOCUMENTS

| | | | | |
|---|---|---|---|---|
| 8,060,747 B1 * | 11/2011 | Leonard | ................... | G06F 21/64 713/176 |
| 10,068,064 B2 * | 9/2018 | Hahn | ...................... | H04L 9/3247 |
| 10,181,954 B2 * | 1/2019 | Naik | ...................... | H04L 9/3247 |
| 2003/0028774 A1 * | 2/2003 | Meka | ...................... | H04L 9/3231 713/176 |
| 2005/0114848 A1 * | 5/2005 | Choi | ................... | G06F 9/45516 717/148 |
| 2005/0193369 A1 * | 9/2005 | Brumme | .................. | G06F 8/52 717/106 |
| 2006/0143600 A1 * | 6/2006 | Cottrell | ................. | G06F 21/572 717/168 |
| 2007/0204165 A1 * | 8/2007 | Lytle | ....................... | G06F 21/64 713/176 |
| 2013/0058477 A1 * | 3/2013 | Kobayashi | ............ | H04L 9/3239 380/28 |
| 2019/0102547 A1 * | 4/2019 | Aktas | ....................... | G06F 21/56 |
| 2019/0182053 A1 * | 6/2019 | Varpiola | ............... | G06Q 50/184 |

OTHER PUBLICATIONS

Red Hat Mobile Application Platform 4.5; Mobile Developer Guide; updated Dec. 21, 2017 (70 pages).
Mobile code signing; Windows Drivers, Jul. 21, 2015, Microsoft, https://msdn.microsoft.com/en-us/library/windows/hardware/dn756634(v=vs.85).aspx; retrieved Feb. 26, 2018, pp. 1-4.
Code Signing Your Hybrid App, copyright 2016-2017 Progress Software Corporation, https://docs.telerik.com/platform/appbuilder/cordova/code-signing-your-app/code-signing; pp. 1-2.

* cited by examiner

*Primary Examiner* — Sher A Khan
(74) *Attorney, Agent, or Firm* — K&L Gates LLP

(57) ABSTRACT

Secure, platform-independent code signing is disclosed. For example, a project file is associated with metadata, and a memory is communicatively coupled with one or more processors that execute to retrieve the metadata. A guest associated with a hosting platform of the project file is instantiated. A toolchain and a signature associated with the project file are loaded to the guest, where the toolchain is determined based on the metadata. The project file is built into an executable file. The executable file is signed with the signature, resulting in a certified executable.

19 Claims, 8 Drawing Sheets

US 10,686,608 B2

SECURE, PLATFORM-INDEPENDENT CODE SIGNING

BACKGROUND

The present disclosure generally relates to signing applications for execution on proprietary platforms. In computer systems, operating system providers, including mobile device operating system providers, may typically require application developers to digitally sign their application releases before allowing applications to execute on their respective operating systems. Code signing may require private keys from authorized developers to authenticate the origin of the application, providing trustworthiness and security for end consumers.

In various computer systems, it may be advantageous to scale application deployments by using isolated guests such as virtual machines and containers that may be used for creating hosting environments for running application programs. Typically, isolated guests such as containers and virtual machines may be launched to provide extra compute capacity of a type that the isolated guest is designed to provide. Isolated guests enable a programmer to quickly scale the deployment of applications to the volume of traffic requesting the applications. Isolated guests may be deployed in a variety of hardware environments. There may be economies of scale in deploying hardware in a large scale. For example, multiple containers may also be clustered together to perform a more complex function than the respective containers are capable of performing individually. In an example, a container and/or a cluster of containers may be implemented specifically to execute certain specific workloads.

SUMMARY

The present disclosure provides a new and innovative system, methods and apparatus for secure, platform-independent code signing. In an example, a project file is associated with metadata, and a memory is communicatively coupled with one or more processors that execute to retrieve the metadata. A guest associated with a hosting platform of the project file is instantiated. A toolchain and a signature associated with the project file are loaded to the guest, where the toolchain is determined based on the metadata. The project file is built into an executable file. The executable file is signed with the signature, resulting in a certified executable.

Additional features and advantages of the disclosed method and apparatus are described in, and will be apparent from, the following Detailed Description and the Figures.

DETAILED DESCRIPTION OF EXAMPLE EMBODIMENTS

Figure 1:
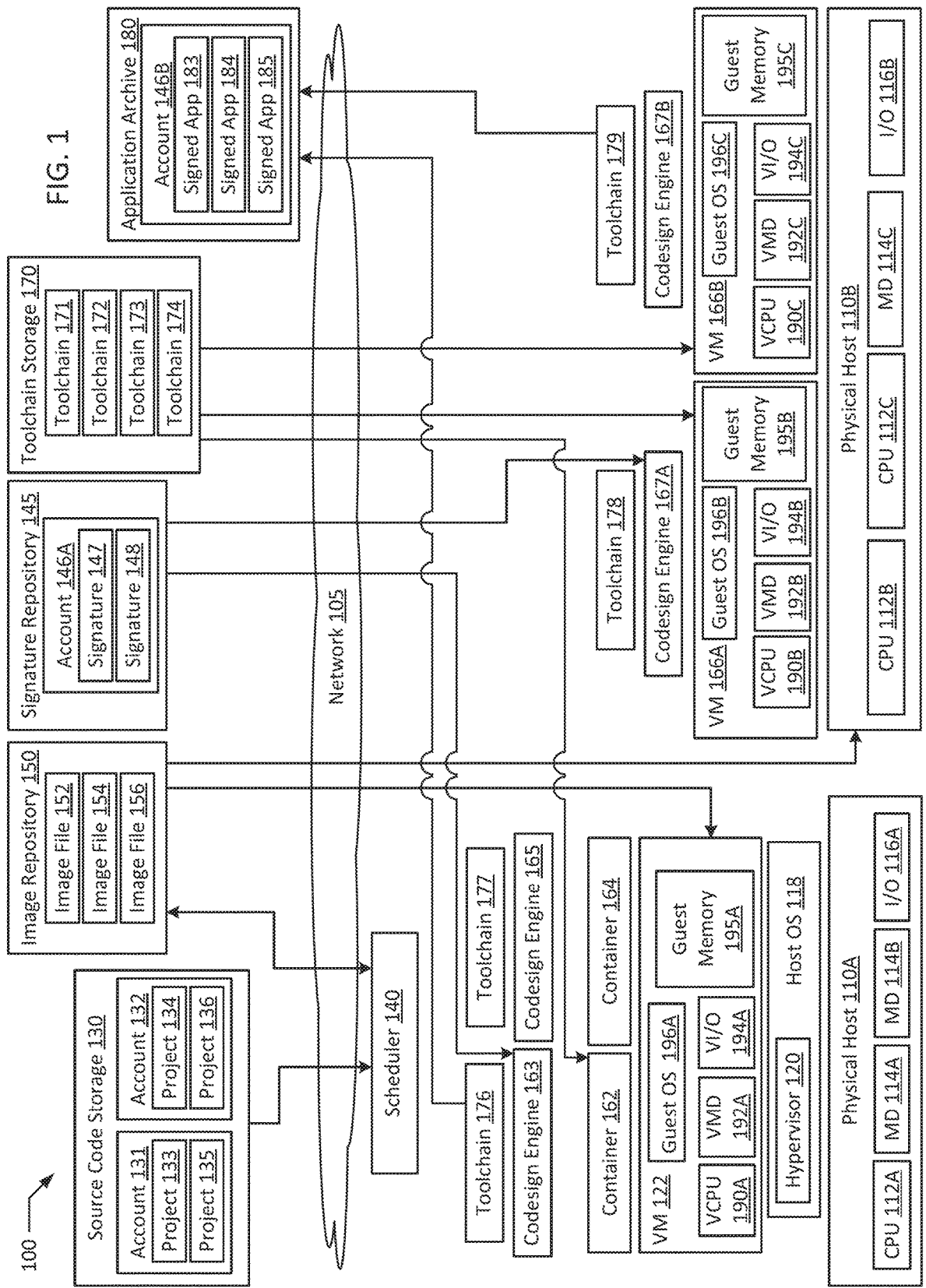
FIG. 1 is a block diagram of a secure, platform-independent code signing system according to an example of the present disclosure.

In computer systems, having applications signed by trusted sources is an important part of the computer systems' security framework, defending against the introduction of malicious code. Therefore, private keys and signatures of application developers may be highly secret information that is kept by a minimal number of people and systems. Typically, methods for code signing may be platform-dependent, with each platform and/or operating system (e.g., Red Hat® Enterprise Linux®, Microsoft® Windows®, Apple® OS X®, etc.) typically implementing code signing through proprietary methods. These code signing methods may typically be updated regularly as updates to the platforms are released. Code signing is especially important in many mobile device platforms (e.g., Google® Android®, Apple® iOS®, Microsoft® Windows 10®, BlackBerry OS®, etc.) where the devices may be configured to only execute signed and authorized applications. On many platforms, executing unsigned applications may require administrator or other elevated rights.

There are typically advantages to streamlining the software development lifecycle, shortening the time between code being written and updates being deployed to consumers. Typical levels of reduced software development lifecycles include the "Continuous Integration", "Continuous Delivery", and "Continuous Deployment" models of software development. In Continuous Integration, changes are typically merged into an application project's main code base as often as possible (e.g., after completing work on each module). These changes are then built into an executable program that is run against a standard test suite, typically a set of automated tests specific to the application. Each change is therefore incremental and multiple developers may work on the same codebase with assurance that their incremental changes will work with those of their colleagues before a final release is pushed to consumers. In Continuous Delivery, Continuous Integration is further supplemented by the capability of releasing code that has passed through testing on demand. Typically this may be achieved through automating the release process. With Continuous Delivery, each release is typically small so the universe of code to debug if there is a problem is typically limited, allowing for agile updates. In Continuous Deployment, code changes that pass through automated testing are automatically released as updates, typically providing the fastest updates to users and the fastest feedback from users for new features. However, with Continuous Deployment, test suites may require significantly more updates to ensure that most bugs in new code are caught before release.

In many systems, however, code signing may be an impediment to Continuous Integration, Continuous Delivery, and Continuous Deployment, especially on applications that support multiple target platforms. An application owner may be hesitant to share their private key or signature with their developers, especially if the developers include outside contractors. Therefore, the application owner may need to maintain infrastructure dedicated to building and code signing that may be locked down to a limited number of users with elevated rights, creating a bottleneck for code integration. In addition, keeping up to date with changes to code signing methodology for multiple platforms may be an onerous and inefficient task. A suboptimal solution that is typically implemented where performance and graphical requirements for a given application are not critical may be to implement code within a virtualized hosting solution on top of a native platform, such that one source code build may execute on a variety of underlying hardware and operating system components (e.g., Java®, Cordova®, Xamarin®). Typically, these virtualized solutions have significant performance and system resource overhead and may not typically support all of the graphical features of a native platform.

In computer systems implementing virtualization, for example in the form of isolated guests, typically, virtual machines and/or containers are used. In an example, a virtual machine ("VM") may be a robust simulation of an actual physical computer system utilizing a hypervisor to allocate physical resources to the virtual machine (e.g., Red Hat® Enterprise Virtualization). In some examples, a container based virtualization system such as Red Hat® OpenShift® or Docker® may be advantageous, as container based virtualization systems may be lighter weight than systems using virtual machines with hypervisors. In the case of containers, oftentimes a container will be hosted on a physical host or virtual machine that already has an operating system (e.g., Red Hat® Enterprise Linux®) executing, and the container may be hosted on the operating system of the physical host or VM. In large scale implementations, container schedulers, such as those included in container orchestrators (e.g., Kubernetes®), generally respond to frequent container startups and cleanups with low latency. Containers may enable wide spread, parallel deployment of computing power for specific tasks. In a typical example, a container may be instantiated to process a specific task and reaped after the task is complete.

The present disclosure aims to address the hurdles placed on implementing Continuous Integration and even typically shorter software deployment cycles such as Continuous Delivery or Continuous Deployment by implementing secure, platform-independent code signing. In an example, by creating a centralized service that builds and signs code, the overhead for keeping up to date with process updates by various vendors may be centralized, thereby reducing the overall need to maintain application owner specific implementations for building and signing processes on shared environments (e.g., multi-tenant clouds). In an example, a centralized service (e.g., Red Hat® Mobile Application Platform®) may be responsible for implementing software development lifecycle features such as Continuous Integration instead of application owner specific solutions. For example, such a centralized service may be deployed to various data centers as part of a cloud provider's offerings. Security drawbacks associated with a shared code building and signing system may be addressed through virtualizing the system in task specific guests that are reaped after each build process. In an example, isolating workloads to specific guests may provide enhanced security, for example, by eliminating a need for shared access to the same compute resource (e.g., a specific guest) by multiple users performing similar tasks, since each user and/or job may be assigned to a separate guest. While private keys and/or signatures need to be stored to be accessed by the system, such storage may be configured to be in a secure zone that is not connected to public networks (e.g., the internet). For example, the signature storage may be configured to allow updates from authenticated users through an intermediary gateway server, but may be configured to only allow retrieval of signatures by a guest executing a code signing task with task specific authentication information, and not by a developer connecting from an external network. In an example, rather than having guests accessing secured storages with an elevated account, each guests' access rights may be built into the guest at instantiation based on the rights of an account making a change to a code base. Therefore, the code signing application does not require elevated database access rights to view all records of a secure database for all possible users (e.g., a database with all application owners' signatures). Since the guests executing the build and code signing do not have elevated access rights, they would not be an avenue for malicious actors to exploit to circumvent information access controls. In an example, by isolating each job to a separate, short-lived guest, the risk of a security breach affecting released code is significantly limited, especially any security breach with broad reaching effects. Secure, platform-independent code signing therefore enables Continuous Integration without the sharing of code signing signature information to developers working on a code base, and without requiring custom code building and signing infrastructure to be implemented by application owners.

FIG. 1 is a block diagram of a secure, platform-independent code signing system according to an example of the present disclosure. The system 100 may include one or more physical hosts 110A-B. Each physical host 110A-B may in turn include one or more physical processors (e.g., CPU 112A-C) communicatively coupled to memory devices (e.g., MD 114A-C) and input/output devices (e.g., I/O 114A-B). As used herein, physical processor or processors 112A-C refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-C refer to volatile or non-volatile memory devices, such as RAM, ROM, EEPROM, or any other device capable of storing data. As discussed herein, I/O devices 116A-B refer to devices capable of providing an interface between one or more processor pins and an external device, the operation of which is based on the processor inputting and/or outputting binary data. CPUs 112A-C may be interconnected using a variety of techniques, ranging from a point-to-point processor interconnect, to a system area network, such as an Ethernet-based network. Local connections within each physical host 110A-B, including the connections between processor 112A and a memory device 114A-B and between processor 112A and I/O device 116A may be provided by one or more local buses of suitable architecture, for example, peripheral component interconnect (PCI).

In an example, physical hosts 110A-B may run one or more isolated guests, for example, VMs 122 and 166A-B, and containers 162 and 164. In an example, any of containers 162 and 164 may be a container using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, a given service may require the deployment of multiple containers and/or pods in multiple physical locations. In an example, VMs 122 and 166A-B may be VMs executing on physical hosts 110A-B. In an example, containers 162 and 164 may execute on VM 122. In an example, scheduler 140, source code storage 130, image repository 150, signature repository 145, toolchain storage 170, and application archive 180 may execute either independently or within a virtualized guest. In an example, any of containers 162 and 164 may be executing directly on either of physical host 110A without a virtualized layer in between. In an example, isolated guests may be further nested in other isolated guests. For example, VM 122 may host containers (e.g., containers 162 and 164). In addition, containers and/or VMs may further host other guests necessary to execute their configured roles (e.g., a nested hypervisor or nested containers). For example, a VM (e.g., VM 122, or 166A-B) and/or a container (e.g., containers 162 and 164) may further host a Java® Virtual Machine ("JVM") if execution of Java® code is necessary.

System 100 may run one or more VMs (e.g., VM 122), by executing a software layer (e.g., hypervisor 120) above the hardware and below the VM 122, as schematically shown in FIG. 1. In an example, the hypervisor 180 may be components of respective host operating system 118 executed on physical host 110A. In another example, the hypervisor 120 may be provided by an application running on operating system 118. In an example, hypervisor 120 may run directly on physical host 110A without an operating system beneath hypervisor 120. Hypervisor 120 may virtualize the physical layer, including processors, memory, and I/O devices, and present this virtualization to VM 122 as devices, including virtual central processing unit ("VCPU") 190A, virtual memory devices ("VIVID") 192A, virtual input/output ("VI/O") device 194A, and/or guest memory 195A. In an example, a container may execute directly on host OSs 118 without an intervening layer of virtualization.

In an example, a VM 122 may be a virtual machine and may execute a guest operating system 196A which may utilize the underlying VCPU 190A, VIVID 192A, and VI/O 194A. One or more isolated guests (e.g., containers 160 and 170) may be running on VM 112 under the respective guest operating system 196A. Processor virtualization may be implemented by the hypervisor 120 scheduling time slots on one or more physical processors 112A such that from the guest operating system's perspective those time slots are scheduled on a virtual processor 190A.

VM 122 may run on any type of dependent, independent, compatible, and/or incompatible applications on the underlying hardware and host operating system 118. In an example, containers 162 and 164 running on VM 122 may be dependent on the underlying hardware and/or host operating system 118. In another example, containers 162 and 164 running on VM 122 may be independent of the underlying hardware and/or host operating system 118. In an example, containers 162 and 164 running on VM 122 may be compatible with the underlying hardware and/or host operating system 118. Additionally, containers 162 and 164 running on VM 122 may be incompatible with the underlying hardware and/or OS. The hypervisor 118 may manage memory for the host operating system 118 as well as memory allocated to the VM 122 and guest operating system 196A such as guest memory 195A provided to guest OS 196A. In an example, VMs 166A-B and their associated components guest OSes 196B-C, VCPU 190B-C, VIVID 192B-C, VI/O 194B-C, and guest memory 195B-C may perform similar corresponding roles to the components in VM 122. Similarly, a hypervisor and/or host OS may function in similar roles as related to VMs 166A-B as hypervisor 120 and host OS 118 do to VM 122.

In an example, network 105 may be any form of suitable network for enabling communications between computing devices, for example, a public network (e.g., the Internet), a private network (e.g., a local area network (LAN) or wide area network (WAN)), or a combination thereof. In an example, scheduler 140 may be a component responsible for assigning compute tasks executed in guests to various host nodes (e.g., VM 122, physical hosts 110A-B). In the example, scheduler 140 is responsible for launching guests (e.g., containers 162 and 164, and VMs 122, and 166A-B) on the selected hosts. In an example, scheduler 140 may be part a virtualization orchestrator (e.g., Red Hat® OpenShift®, Kubernetes®) that may include additional subcomponents responsible for additional tasks. In an example, scheduler 140, source code storage 130, image repository 150, signature repository 145, toolchain storage 170, and/or application archive 180 may be implemented via any form of executable code (e.g., executable file, script, application, service, daemon, etc.). In an example, scheduler 140 may assign computing tasks (e.g., building and signing projects 133-136) to hosts or guests capable of executing such computing tasks (e.g., containers 162 and 164, and/or VMs 166A-B).

In an example, source code storage 130, image repository 150, signature repository 145, toolchain storage 170, and/or application archive 180 may be any form of suitable storage system for storing data and/or metadata appropriate to each respective storage, for example a relational database. The source code storage 130, image repository 150, signature repository 145, toolchain storage 170, and/or application archive 180 may be stored in a database associated with a database management system ("DBMS"). A DBMS is a software application that facilitates interaction between the database and other components of the system 200. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, a relational database may be implemented with add-on packages and/or services for additional functionality and security (e.g., Red Hat Database®). In an example, source code storage 130, image repository 150, signature repository 145, toolchain storage 170, and/or application archive 180 may be stored in a database organized as a formal database with a schema such as a relational schema with defined tables, indices, links, triggers, various commands etc. In some examples, source code storage 130, image repository 150, signature repository 145, toolchain storage 170, and/or application archive 180 may not be organized as a formal database, but may instead be an alternative storage structure capable of holding the information stored in source code storage 130, image repository 150, signature repository 145, toolchain storage 170, and/or application archive 180, including but not limited to a file, folder, directory, registry, array, list, etc. In an example, one or more of source code storage 130, image repository 150, signature repository 145, toolchain storage 170, and/or application archive 180 may be combined into combined storage repositories. For example, image repository 150 and toolchain storage 170 may be combined, and source code storage 130 and signature repository 145 may be combined.

In an example, source code storage 130 may store source code projects (e.g., projects 133-136) for a plurality of application developers under a respective plurality of accounts (e.g., accounts 131 and 132). In an example, source code storage 130 may be implemented as a software configuration management system, with change controls and change branching and merging features for source code projects. In an example, account 131 may be an account associated with a developer working on two applications (e.g., projects 133 and 135) for one native platform, while account 132 may be an account associated with a second developer working on the same two applications but for a different native platform (e.g., projects 134 and 136). In the example, each developer may upload their code changes under their own respective account (e.g., accounts 131 and 132) and respective credentials. In some examples, a common code base may be developed that may be compiled for multiple different native platforms, with variable sections of code containing platform specific implementations for features that are platform specific (e.g., graphical user interface ("GUI") components) and shared code for backend processing components. In such examples, a programming language compatible with multiple platforms may be selected (e.g., C, C++). In an example, source code storage 130 may be organized by project, with each incremental saved change being attributed to an account submitting the change. In an example, scheduler 140 detecting a change to a project (e.g., projects 133-136), for example, by subscribing to changes to source code storage 130, may be a trigger for scheduler 140 initiating a building and signing process for such a project (e.g., projects 133-136).

In an example, image repository 150 may store image files (e.g., image files 152, 154, and 156) from which guests (e.g., VMs 122, 166A-B, containers 162, 164) are launched. In an example, image files for guests executing code building and signing may include an appropriate codesign engine (e.g., codesign engines 163, 165, 167A, 167B) for the platform that the application being built is intended to execute on. In an example, a codesign engine may be part of a larger integrated development environment ("IDE") (e.g., Xcode®, Android® Studio, Microsoft® Visual Studio®, GNU Toolchain, etc.). In an example, a codesign engine (e.g., codesign engines 163, 165, 167A, 167B) may be any component capable of generating a final signature for an application for a specific platform from inputs from signature repository 145 and/or source code storage 130. For example, a final signature may be stored in encrypted form (e.g., signatures 147 and 148). A signature may also be generated based on certificates or other keys associated with an application owner. In some examples, a codesign engine (e.g., codesign engines 163, 165, 167A, 167B) may further include capabilities to perform platform specific modifications to compiled executable binary programs as necessary for executing applications on such platforms. In an example, a codesign engine (e.g., codesign engines 163, 165, 167A, 167B) includes validation modules to validate a signature (e.g., signatures 147 and 148) before insertion. In an example, image files 152, 154, and/or 156 may additionally include a build automation engine (e.g., Jenkins®, GNU Make, Apache® Maven, Gradle®, Visual Studio® Team Services, etc.). In an example, a build automation engine may execute a build process outlined in a configuration file, for example, stored as a file or metadata in conjunction with a source code project (e.g., projects 133-136).

In an example, a toolchain (e.g., toolchain 171-174, 176-179) may include all of the modules, components, and/or dependencies necessary for building a source code project (e.g., projects 133-136) into an executable program. For example, toolchains commonly include a build automation tool, a compiler, a linker, an assembler, shared libraries, a debugger, and/or an automated testing utility. In an example, a codesign engine may be a part of a toolchain (e.g., toolchains 171-174, 176-179). In an example, a toolchain used in conjunction with building a given source code project (e.g., projects 133-136) may determine the compatibility of a generated executable program with a certain platform architecture. For example, container 162 may execute on guest OS 196A (e.g., Red Hat® Enterprise Linux®), and toolchain 176 may output binaries for executing on the same Red Hat® Enterprise Linux®, while container 164 also executing on guest OS 196A may output programs for executing on Android® based on toolchain 177. In some examples, certain toolchains (e.g., toolchains 178 and 179) and/or codesign engines (e.g., codesign engines 167A, 167B) may be incompatible with execution in containers, and may instead be executed in virtual machines (e.g., VMs 166A-B). In an example, toolchains may include additional components for application features such as sound effects, textures, 3D models, animations, etc. In an example, toolchains 176-179 may be copies of toolchains 171-174 loaded to containers 162, 164, and VMs 166A-B from toolchain storage 170 to build projects 133-136. In some examples, scheduler 140 may determine the proper toolchain components to load to each guest (e.g., containers 162, 164, and VMs 166A-B). In other examples, a build automation engine (e.g., Jenkins®) that determines the proper toolchain (e.g., toolchains 171-174) to load for building the project assigned to a particular guest (e.g., containers 162, 164, and VMs 166A-B) may be included with image files 152, 154, and/or 156.

In an example, codesign engines 163, 165, 167A, and 167B may be configured to load a signature file (e.g., signatures 147 or 148) to a guest (e.g., containers 162, 164, and VMs 166A-B) based on the signature requirements of a project (e.g., projects 133-136) being built. In an example, signature files 147 and 148 may be decompressed and/or decrypted before insertion. In an example, signature repository 145 may be a subcomponent of source code storage 130. In an example, account 146A may belong to an application owner for whom the developers of accounts 131 and 132 develop applications. In an example, an application owner of account 146A may have one signature for one platform (e.g., signature 147 for Android®) and a second signature for a second platform (e.g., signature 148 for iOS®). In some examples, the final version of a signature to be inserted into an application is generated in situ by codesign engines 163, 165, 167A, and 167B from inputs retrieved from source code storage 130 and/or signature repository 145, for example, certificates.

In an example, application archive 180 securely stores signed applications (e.g., signed apps 183-185) that have been tested by toolchains 176-179. In an example, signed apps 183-185 may be encrypted. In an example, account 146B belongs to the same application owner as account 146A. In an example, the application owner of account 146B is provided a retrieval link to signed apps 183-185. In an example, signed apps 183-185 may be directly deployed to a digital distribution channel for application updates on the native platforms where signed apps 183-185 are designed to execute.

FIGS. 2A-D are block diagrams illustrating a system performing secure, platform-independent code signing according to an example of the present disclosure. In an example, systems 200-203 illustrated in FIGS. 2A-D follow a build of two copies of an application for execution on two different platforms through the secure, platform independent code signing system 100 illustrated in FIG. 1.

Figure 2A:
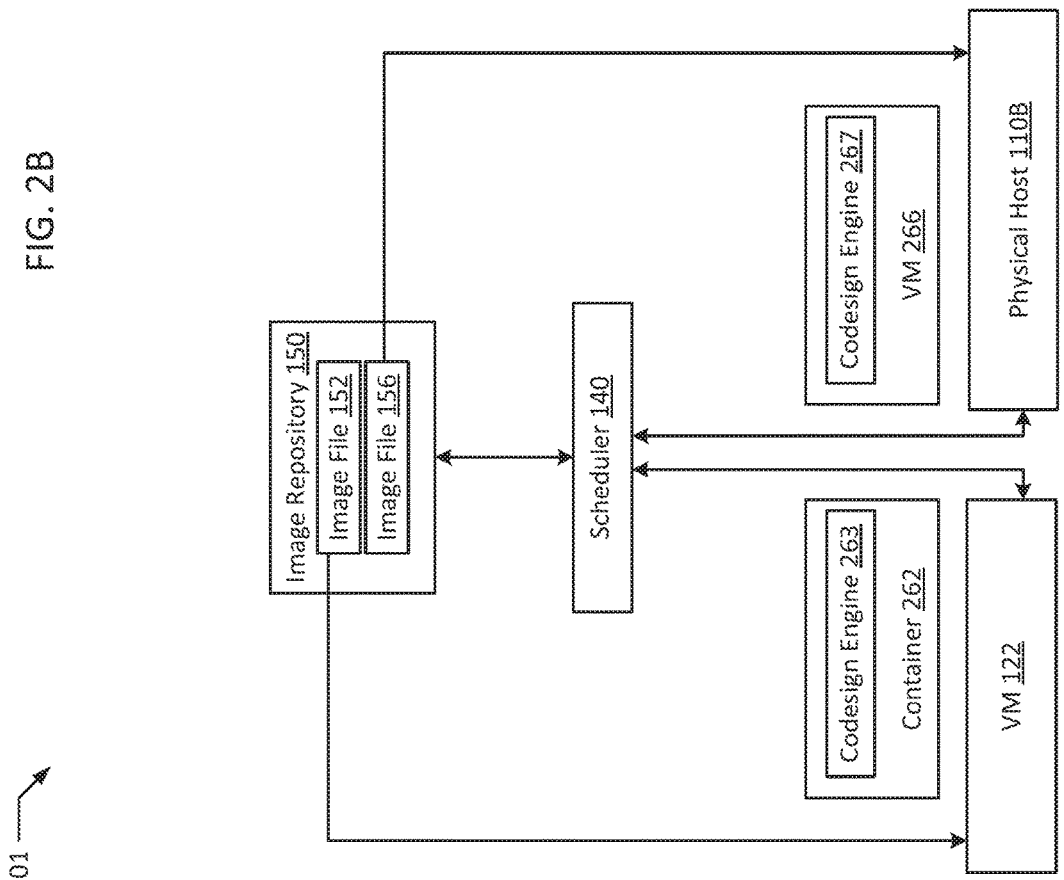
FIGS. 2A-D are block diagrams illustrating a system performing secure, platform-independent code signing according to an example of the present disclosure.

In an example illustrated in system 200 on FIG. 2A, workstations 210 and 212 may be any computer system equipped with an appropriate software development kit ("SDK") and/or IDE for modifying source code for projects 233A and 234A. In an example, a first developer works on source code (e.g., project 233A) for an application for a first platform (e.g., Android®) on workstation 210. In the example, a second developer works on source code (e.g., project 234A) for the same application for a second platform (e.g., iOS®) on workstation 212. In an example, completed projects 233A and 234A are uploaded under the developers' respective accounts 131 and 132 to source code storage 130 as projects 233B and 234B. In an example, scheduler 140 may include a build automation component (e.g., a Jenkins® plugin) that detects that projects 233B and 234B are updated.

Figure 2B:
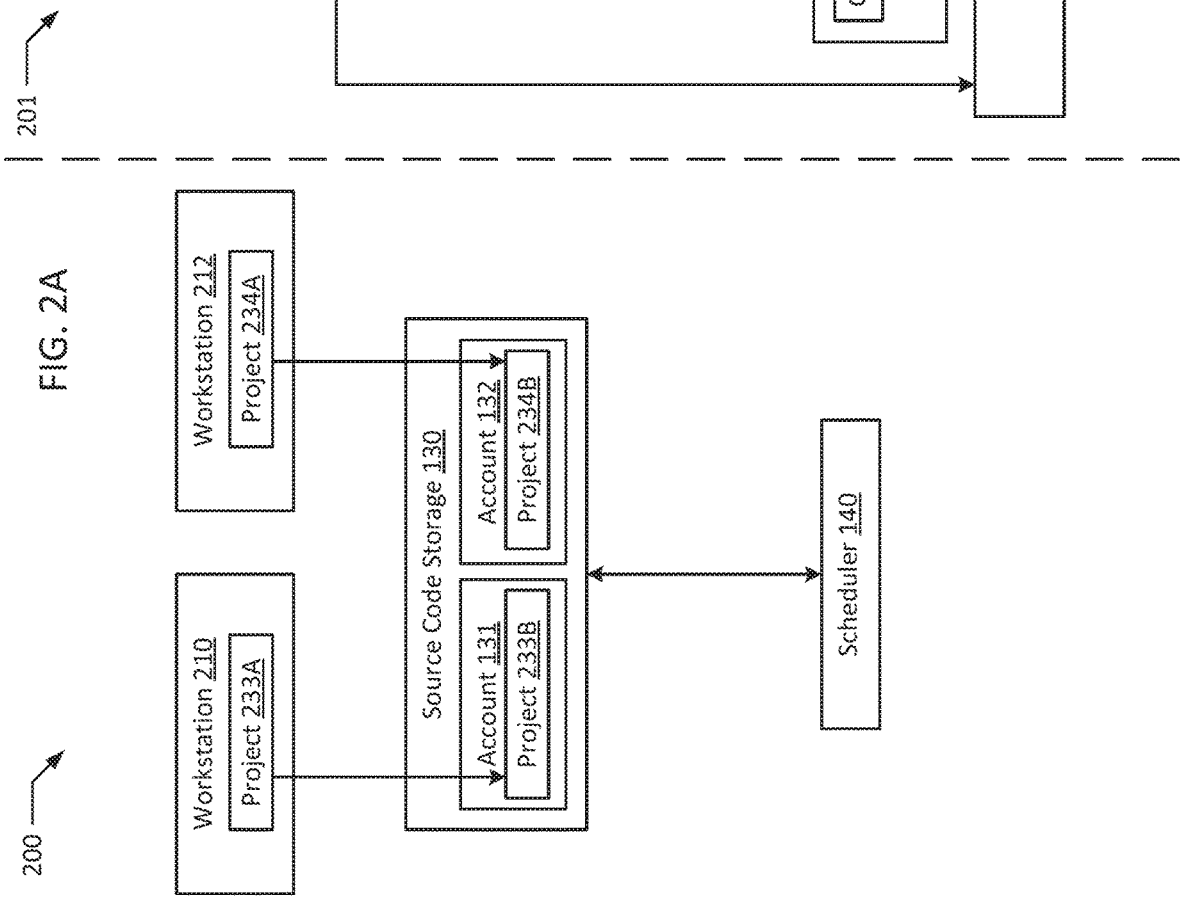

In the example continued in system 201 illustrated in FIG. 2B, scheduler 140 determines that image file 152 in image repository 150 includes codesign engine 263 for signing Android® applications, while image file 156 includes codesign engine 267 for signing iOS® applications. In an example, the determination of appropriate image file may be based on a build automation configuration in files or metadata associated respectively with projects 233B and 234B. In the example, codesign engine 263 may execute in a container, so scheduler 140 launches container 262 on VM 122 with codesign engine 263. In the example, codesign engine 267 does not execute in containers and therefore image file 156 with codesign engine 267 is launched as VM 266 on physical host 110B.

Figure 2D:
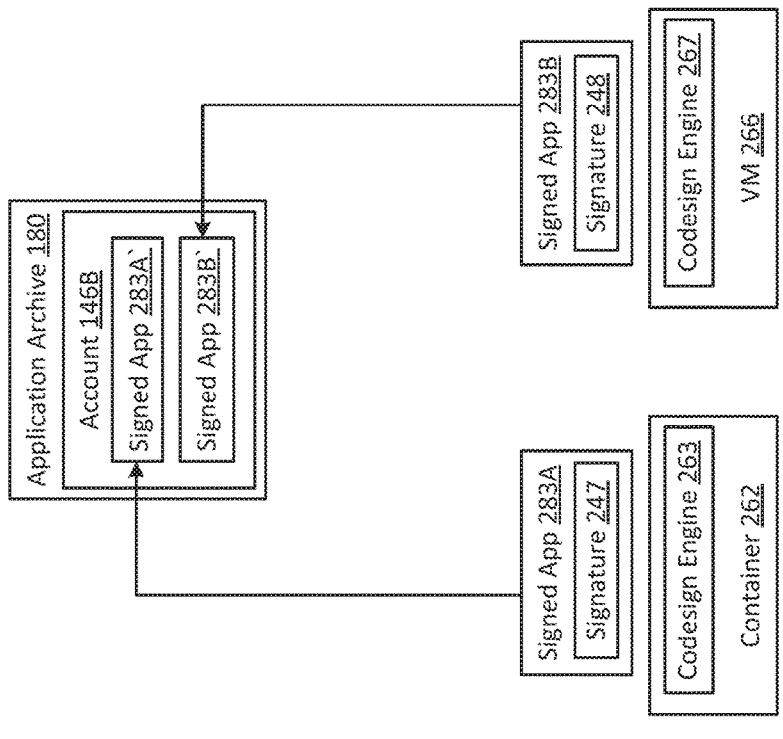
Figure 2C:
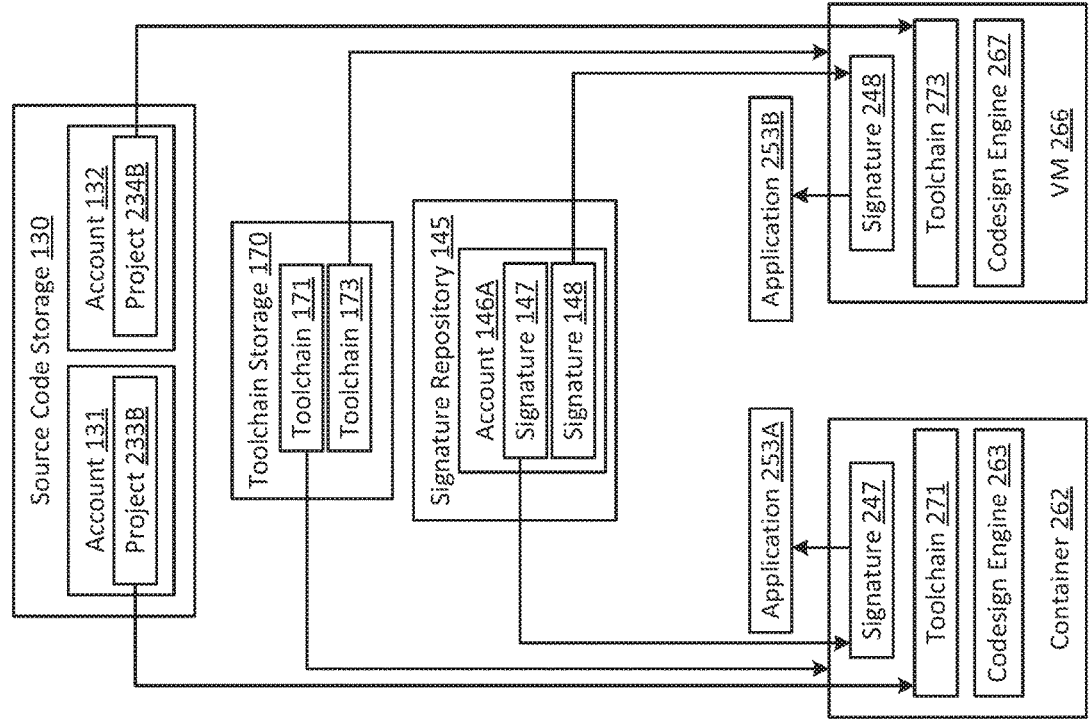

In the example continued in system 202 illustrated in FIG. 2C, various additional components necessary for building projects 233B and 234B into signed applications are added to the guests prepared to execute the build processes (e.g., container 262 and VM 266). In an example, scheduler 140 may determine the appropriate additional components to load to the guests. In an example, a build automation engine included on the guests determines the appropriate components to load. In an example, container 262 loads toolchain 171 as toolchain 271 for building Android® applications, while VM 266 loads toolchain 173 as toolchain 273 for building iOS® applications. In an example, project 233B is fed as input into toolchain 271 while project 234B is fed as input into toolchain 273. In some examples, projects 233B and 234B may be the same project file, however, certain platform specific elements (e.g., GUI components) may be implemented with alternative blocks of source code. In an example, toolchain 271 executes to build and test project 233B as application 253A, while toolchain 273 executes to build and test project 234B as application 253B.

In an example, signature 147 is loaded to container 262 while signature 148 is loaded to VM 266. In the example, the signatures may be loaded before, during, or after the project files (e.g., projects 233B and 234B) are loaded to container 262 and VM 266 respectively. In an example, signatures 247 and 248 are validated by codesign engines 263 and 267 respectively before being added to applications 253A and 253B respectively.

In the example continued in system 203 illustrated in FIG. 2D, application 253A with the addition of signature 247 becomes signed app 283A, while application 253B with the addition of signature 248 becomes signed app 283B. In an example, additional modifications may be performed to signed apps 283A-B before being stored in application archive 180. For example, signed apps 283A-B may be compressed and/or encrypted. In an example, signed app 283A may be memory aligned (e.g., zipaligned) to optimize loading times on its execution platform. In an example, an entitlement file may be added to signed app 283B. In an example, after signed apps 283A-B are stored in application archive 180, container 262 and the copy of signature 247 on container 262, as well as VM 266 and the copy of signature 248 on VM 266 may be deleted to ensure security. In some examples, the deleted memory storing VM 266 and/or signature 248 may be actively overwritten to prevent forensic recovery for additional security.

Figure 3:
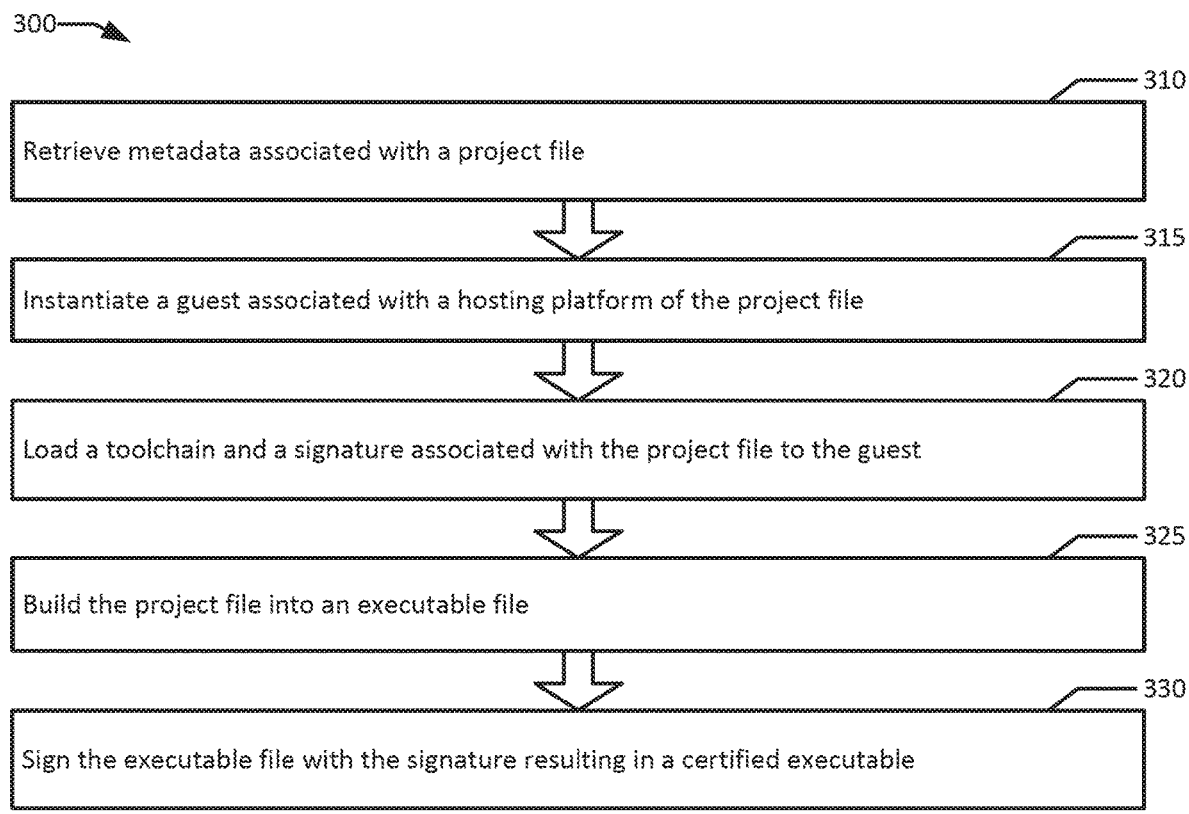
FIG. 3 is a flowchart illustrating an example of orchestrated secure, platform-independent code signing according to an example of the present disclosure.

FIG. 3 is a flowchart illustrating an example of orchestrated secure, platform-independent code signing according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by a scheduler 140.

Example method 300 may begin with retrieving metadata associated with a project file (block 310). In an example, scheduler 140 may detect that project 133 has been updated, and may then request metadata from source code storage 130, including configuration instructions on building, testing, and signing project 133 as a signed application. In an example, project 133 is uploaded to source code storage 130 via a secure communication channel (e.g., via SSH protocol). In an example, project 133 is stored and/or transmitted in an encrypted format.

A guest associated with a hosting platform of the project file is instantiated (block 315). In an example, based on the metadata, scheduler 140 determines that project 133 should be built by a container instantiated from image file 152, and therefore instructs VM 122 to instantiate container 162 from image file 152. In an example, image repository 150 includes image files 152, 154, and 156 for signing applications for execution on different platforms. In the example, container 162 includes codesign engine 163 associated with a hosting platform of project 133, while image file 156 includes codesign engine 167A associated with a hosting platform of project 134.

A toolchain and a signature associated with the project file are loaded to the guest (block 320). In an example, toolchain 171 is loaded to container 162 as toolchain 176. In the example, toolchain 176 may be downloaded and installed from toolchain storage 170. In another example, toolchain 176 may be pre-installed on a network drive, and the network drive may be mounted to container 162 obviating latency caused by downloading and installing. In an example, downloading vs. mounting may be determined by the availability of an appropriate network share with the appropriate toolchain. In an example, project 133 is retrieved from source code storage 130 and decompressed on container 162. In an example, before, after, or concurrently with loading toolchain 176, signature 147 may be loaded to and/or generated on container 162, for example, by codesign engine 163.

The project file is built into an executable file (block 325). In an example, project 133 is built into an executable application file with toolchain 176. In the example, toolchain 176 may include additional debugging and/or testing components to validate the newly constructed application.

The executable file is signed with the signature resulting in a certified executable (block 330). In an example, codesign engine 163 signs the newly tested application file with signature 147. In an example, signing the application file additionally includes setting an entitlement file, for example in metadata associated with the certified executable. In an example, signing the application file includes memory optimizations such as compression, deduplication, and/or memory map alignment for the application file. In an example, a fully signed and tested certified executable (e.g., signed app 183) is uploaded to a secure archive (e.g., application archive 180). In the example, a retrieval link for the certified executable (e.g., signed app 183) is provided to an owner of the certified executable. In an example, signed app 183 is compatible with a first hosting platform (e.g., Android®) but the unsigned executable file is incompatible. For example, attempting to execute the unsigned executable file on the first hosting platform may be prohibited by security controls on the hosting platform. In an example, after signed app 183 is transferred off of container 162 and securely stored in application archive 180, container 162, including its copy of signature 147 and project 133, is securely deleted.

In an example, scheduler 140 retrieves second metadata associated with project 134, then scheduler 140 instructs physical host 110B to instantiate VM 166A from image file 156, where VM 166A is associated with building and signing code for a second hosting platform (e.g., iOS®) associated with project 134. Toolchain 178 determined based on the second metadata is loaded along with signature 148 and project 134 to VM 166A. In the example, project 134 is built into a second executable file and then signed with signature 148 to create signed app 184. In an example, project 133 and project 134 are two versions of a same product, where the signed app 183 is configured to execute on the first hosting platform and signed app 184 is configured to execute on the second hosting platform. In the example, the first hosting platform and the second hosting platform are incompatible with each other. In an example, project 133 may be rebuilt for a third hosting platform (e.g., Windows 10®) on container 164 with toolchain 177. In another example, toolchains 176 and 177 may both build applications for the same hosting platform, however, project 135 compatible with toolchain 176 may be incompatible with toolchain 177, for example, due to missing dependencies for project 135 in toolchain 177.

Figure 4:
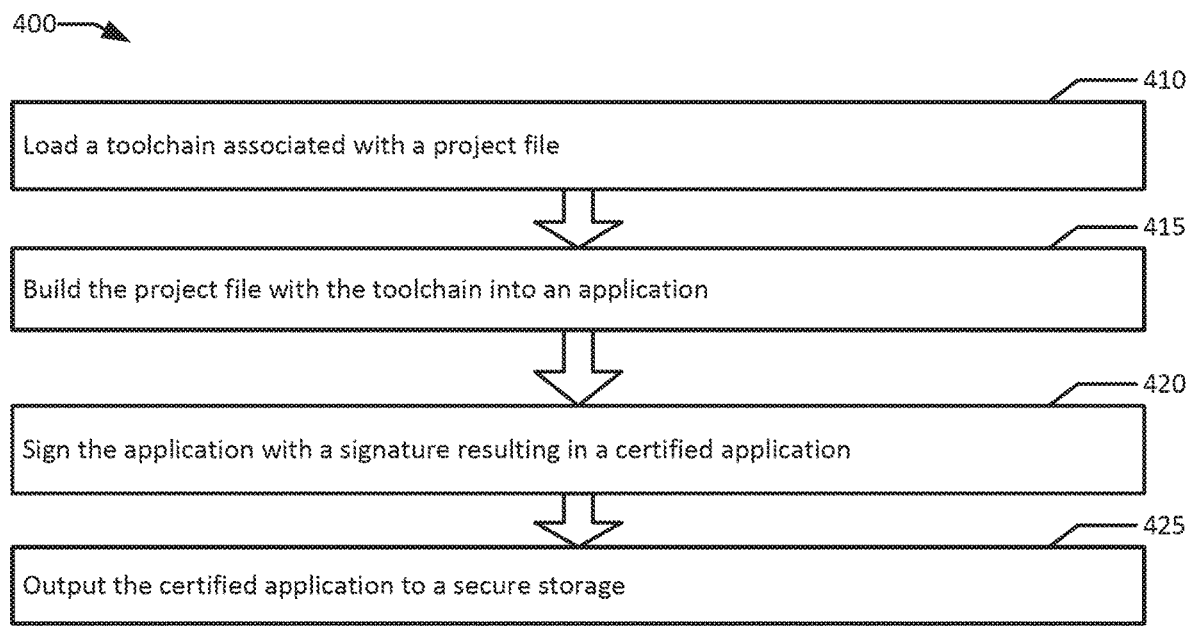
FIG. 4 is a flowchart illustrating an example of secure, platform-independent code signing executed by a virtualized guest according to an example of the present disclosure.

FIG. 4 is a flowchart illustrating an example of secure, platform-independent code signing executed by a virtualized guest according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method 400 is performed by a container 262, in conjunction with a scheduler 140.

Example method 400 may begin with loading a toolchain associated with a project file (block 410). In an example, container 262 and/or scheduler 140 determines that toolchain 271 is the toolchain associated with project 233B and toolchain 271 is loaded to container 262. For example, the determination to load toolchain 271 may be based on a configuration of a build automation engine executing on container 262 and/or scheduler 140. In an example, container 262 is instantiated based on project 233B being committed to a software configuration management system (e.g., source code storage 130). In an example, committing project 233B to source code storage 130 requires authenticating through an authentication system associated with source code storage 130 (e.g., logging into account 131). In an example, modifying signature 147 requires authenticating with a different authentication system for signature repository 145 (e.g., logging into account 146A). In an example, codesign engine 263 may validate signature 147. In the example, if signature 147 fails validation, an error may be raised. In addition, the build process may be cancelled. In an example, a program signed with a faulty signature may be rejected by its intended hosting platform and fail to execute.

The project file is built with the toolchain into an application (block 415). In an example, project 233B is built into application 253A with toolchain 271. The application is signed with a signature resulting in a certified application (block 420). In an example, the signature is associated with the project file. For example, codesign engine 263 signs application 253A to generate signed app 283A. The certified application is output to a secure storage (block 425). In an example, after testing of signed app 283A is complete, signed app 283A is transferred from container 262 to application archive 180. In an example, VM 266 produces signed app 283B from project 234B. In an example, building application 253B uses toolchain 273 and codesign engine 267 which are different from toolchain 271 and codesign engine 263.

Figure 5:
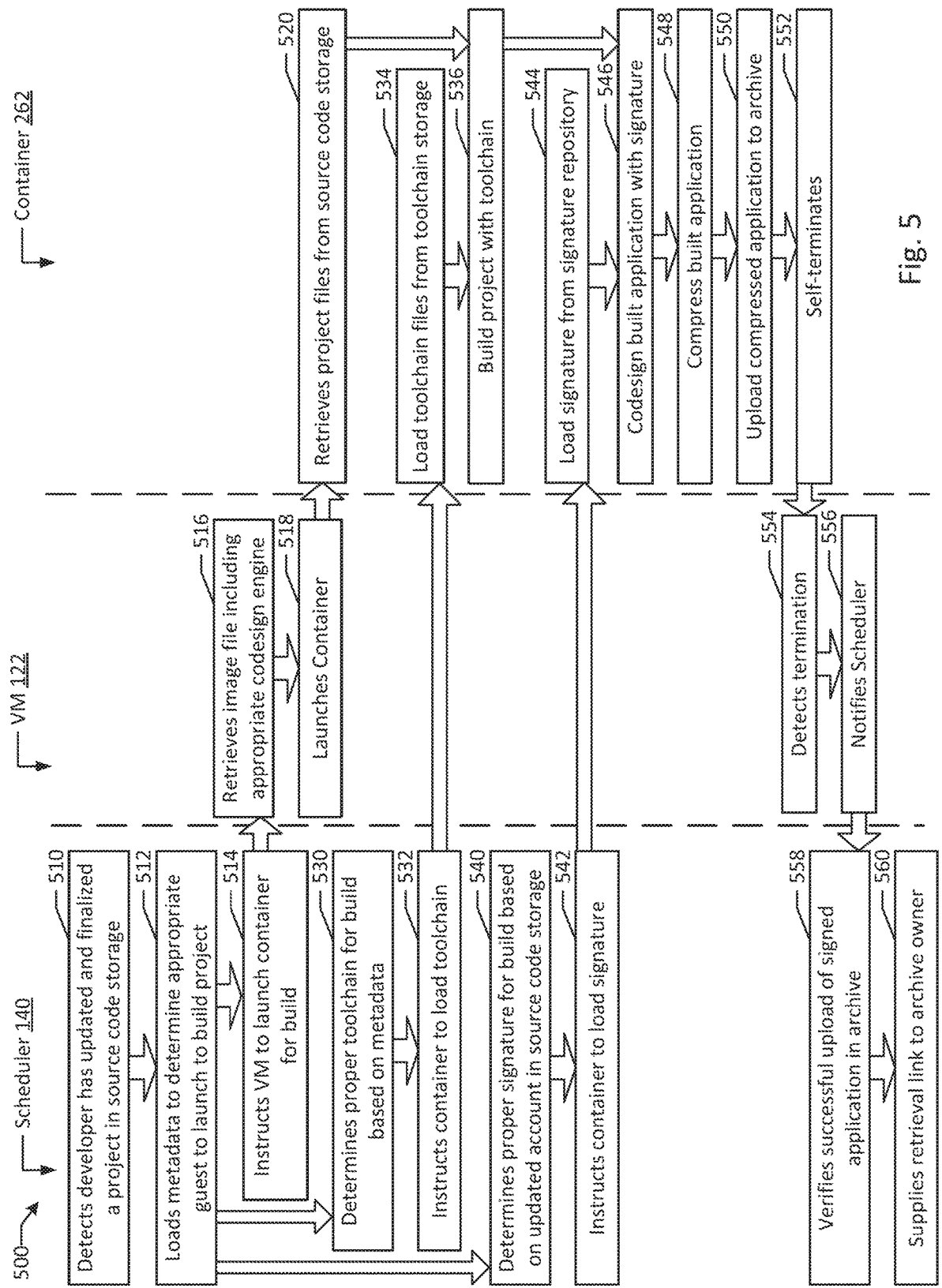
FIG. 5 is flow diagram of an example of secure, platform-independent code signing according to an example of the present disclosure.

FIG. 5 is flow diagram of an example of secure, platform-independent code signing according to an example of the present disclosure. Although the examples below are described with reference to the flowchart illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 500, scheduler 140, VM 122, and container 262 build and code sign an update to an application.

In example system 500, scheduler 140 detects that a developer has updated and finalized a project 233A in source code storage 130 (block 510). In the example, scheduler 140 loads metadata associated with project 233A to determine an appropriate guest to launch to build project 233A (block 512). In another example, a build automation configuration may be loaded by scheduler 140 to orchestrate the building, testing, and release of project 233A. In an example, scheduler 140 instructs VM 122 to launch a container with image file 152 to build project 233A (block 514). In an example, VM 122 retrieves image file 152, including codesign engine 263 from image repository 150 (block 516). In the example, VM 122 then launches container 262 from image file 152 (block 518). In the example, after instantiation, container 262 is configured to retrieve project 233A from source code storage 130 (block 520).

In an example, scheduler 140 determines the proper toolchain for building project 233A while container 262 is being instantiated based on the metadata (block 530). In the example, scheduler 140 instructs container 262 to load toolchain 271 associated with project 233A (block 532). In alternative examples, container 262 may determine to load toolchain 271 based on container 262's own analysis of project 233A and/or metadata or a configuration file associated with project 233A. In an example, container 262 loads toolchain 271 from toolchain storage 170 (block 534). In an example, container 262 begins to build project 233A with toolchain 271 (block 536). In an example, while project 233A is being built by toolchain 271, scheduler 140 determines the proper signature (e.g., signature 147) for project 233A based on account 131 being updated in source code storage 130 (block 540). In an example, the determination to use signature 147 may be made as soon as scheduler 140 detects the update to project 233B. In an example, scheduler 140 instructs container 262 to load signature 147 (block 542). In the example, container 162 loads signature 147 from signature repository 145 as signature 247 (block 544).

In an example, container 262 code signs completed application 253A with signature 247 resulting in signed app 283A (block 546). In the example, container 262 then compresses signed app 283A (block 548). Container 262 then uploads the compressed signed app 283A to application archive 180 (block 550). In the example, container 262 self-terminates (block 552). In an example, VM 122 detects the termination of container 262 (block 554). In the example, VM 122 notifies scheduler 140 that container 262 has terminated (block 556). In an example, scheduler 140 verifies that signed app 283A has been successfully uploaded to application archive 180 (block 558). In the example, scheduler 140 supplies a retrieval link for signed app 283A to an archive owner of account 146B (block 560). In an alternative example, container 262 may verify the successful transfer of signed app 283A and notify the application owner before self terminating. In another example, scheduler 140 may instruct container 262 to terminate after receiving notice from container 262 of the successful build of project 233A and verifying that signed app 283A is successfully stored in application archive 180.

Figure 6:
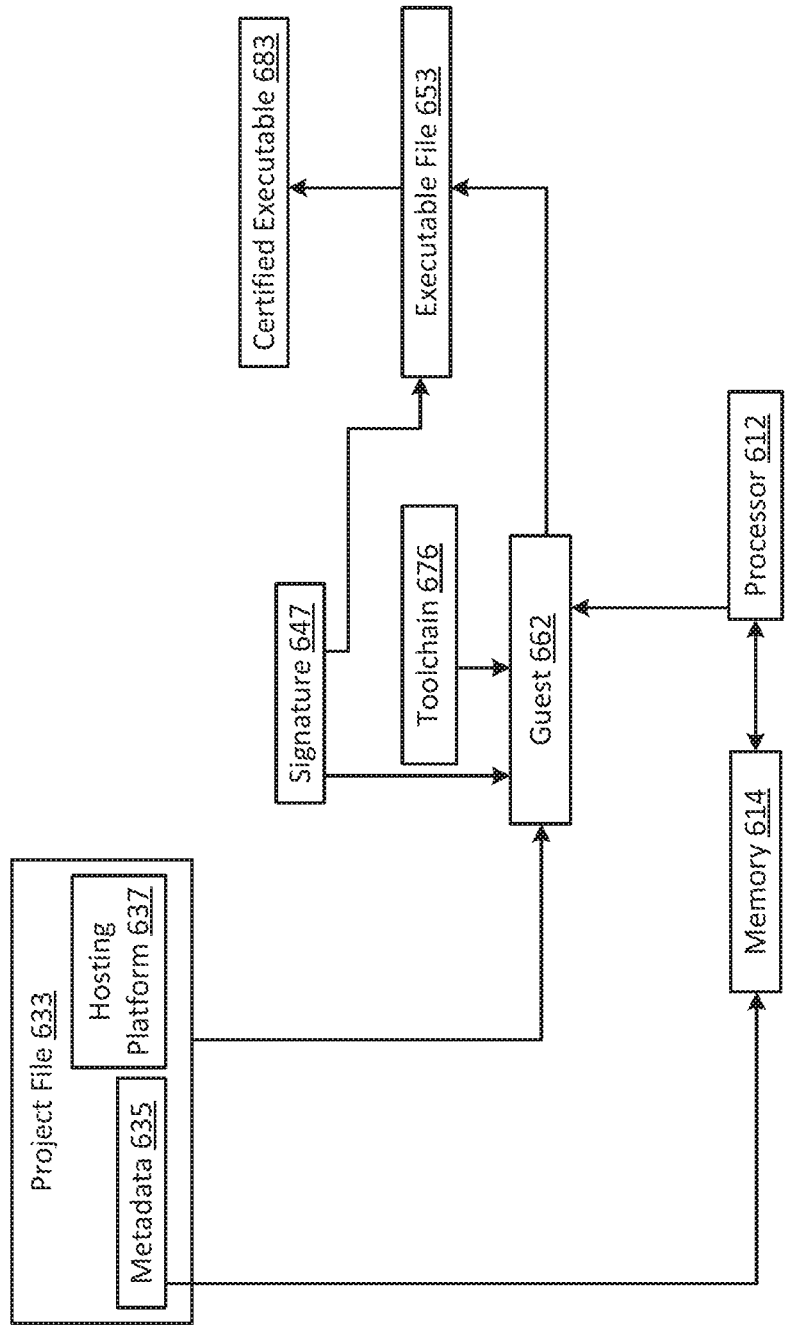
FIG. 6 is a block diagram of an example of an orchestrated secure, platform-independent code signing system according to an example of the present disclosure.

FIG. 6 is a block diagram of an example of an orchestrated secure, platform-independent code signing system according to an example of the present disclosure. Example system 600 includes a project file 633 associated with metadata 635 and a memory 614 communicatively coupled with processor 612 executing to retrieve metadata 635. Guest 662 associated with a hosting platform 637 of the project file 633 is instantiated. Toolchain 676 and signature 647 associated with project file 633 are loaded to guest 662, where toolchain 676 is determined based on metadata 635. Project file 633 is built into executable file 653, and executable file 653 is signed with signature 647 resulting in certified executable 683.

Figure 7:
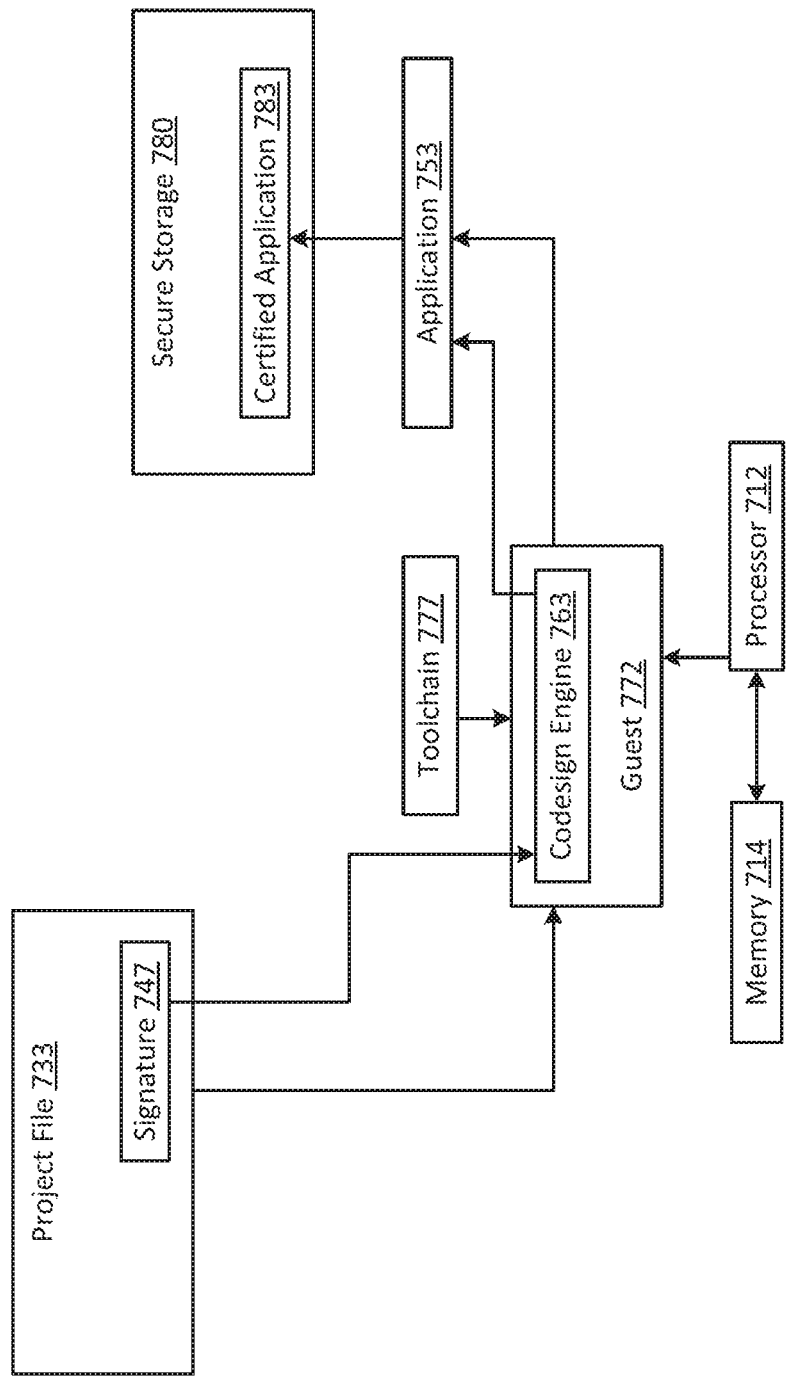
FIG. 7 is a block diagram of an example of a secure, platform-independent code signing system according to an example of the present disclosure.

FIG. 7 is a block diagram of an example of a secure, platform-independent code signing system according to an example of the present disclosure. Example system 700 includes memory 714 communicatively coupled to processor 712. Guest 772, including codesign engine 763, is configured to execute on processor 712 to load toolchain 777 associated with project file 733. Project file 733 is built with toolchain 777 into application 753. Codesign engine 763 signs application 753 with signature 747 resulting in certified application 783, where signature 747 is associated with project file 733. Certified application 783 is output to secure storage 780.

Secure, platform-independent code signing allows for the addition of platform agnostic code signing in Continuous Integration, Continuous Delivery, and Continuous Deployment software development frameworks. By implementing code building toolchains in disposable guests, code security is assured between various users and application owners of the code signing system. By implementing deployment via a build automation service on a scheduler and guest level, a user may precisely configure how their projects are built on each platform their code needs to execute on, while for the most part ignoring different platform vendors' changes to their proprietary tools. By isolating build data, both for project code and signatures in disposable guests, third parties may be restrained from maliciously interfering with builds or remotely accessing certificate and/or private key stores. Also enabled by secure, platform-independent code signing is the integration and testing of new code by developers without access to an application owner's signature files. In addition, rather than each application owner maintaining a build environment for each platform supported by the application owner's software, a centralized service may use build resources much more efficiently since resources that are in use for a few minutes are reclaimed and ready for the next project to be built by a different user, thereby greatly reducing system idle time. Allowing code signing to be provided as a secure service also enables the code signing service to be distributed geographically in various data centers, thereby lowering network latency to access the service without significantly increasing hardware overhead (e.g., by hosting multiple proprietary code signing systems regionally), as each implemented node may be kept in use by multiple application owners' build jobs.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system comprises: a first project file associated with first metadata; a memory communicatively coupled with one or more processors executing to: retrieve the first metadata; instantiate a first guest associated with a first hosting platform of the first project file; load a first toolchain and a first signature associated with the first project file to the first guest, wherein the first toolchain is determined based on the first metadata; build the first project file into a first executable file; and sign the first executable file with the first signature, resulting in a first certified executable.

In accordance with a 2nd exemplary aspect of the present disclosure, which may be used in combination with any one or more of the preceding aspects (e.g., the 1st aspect), further comprising: a source code storage, wherein the first project file is retrieved from the source code storage. In accordance with a 3rd exemplary aspect of the present disclosure, which may be used in combination with any one or more of the preceding aspects (e.g., the 2nd aspect), wherein the first project file is uploaded to the source code storage via a secure communication channel and the first project file is encrypted.

In accordance with a 4th exemplary aspect of the present disclosure, which may be used in combination with any one or more of the preceding aspects (e.g., the 1st aspect), further comprising: an image repository storing a plurality of image files including a first image file associated with the first guest and a different second image file. In accordance with a 5th exemplary aspect of the present disclosure, which may be used in combination with any one or more of the preceding aspects (e.g., the 4th aspect), wherein the first image file includes a first codesign engine associated with the first hosting platform, and the second image file includes a second codesign engine associated with a second hosting platform.

In accordance with a 6th exemplary aspect of the present disclosure, which may be used in combination with any one or more of the preceding aspects (e.g., the 1st aspect), wherein the first toolchain includes first dependencies of the first project file, which includes a first compiler. In accordance with a 7th exemplary aspect of the present disclosure, which may be used in combination with any one or more of the preceding aspects (e.g., the 1st aspect), wherein the first toolchain is downloaded and installed to the first guest. In accordance with a 8th exemplary aspect of the present disclosure, which may be used in combination with any one or more of the preceding aspects (e.g., the 1st aspect), wherein a first mountable storage has the first toolchain preinstalled, and the first mountable storage is mounted to the first guest. In accordance with a 9th exemplary aspect of the present disclosure, which may be used in combination with any one or more of the preceding aspects (e.g., the 1st aspect), further comprising: a secure archive, wherein the first certified executable is stored in the secure archive. In accordance with a 10th exemplary aspect of the present disclosure, which may be used in combination with any one or more of the preceding aspects (e.g., the 9th aspect), wherein a retrieval link to the first certified executable is provided to an owner.

In accordance with a 11th exemplary aspect of the present disclosure, which may be used in combination with any one or more of the preceding aspects (e.g., the 1st aspect), wherein the first certified executable is compatible with the first hosting platform and the first executable file is incompatible with the first hosting platform. In accordance with a 12th exemplary aspect of the present disclosure, which may be used in combination with any one or more of the preceding aspects (e.g., the 1st aspect), wherein the first certified executable is transferred off of the first guest, and then the first guest is terminated and storage used by the first guest securely deleted.

In accordance with a 13th exemplary aspect of the present disclosure, which may be used in combination with any one or more of the preceding aspects (e.g., the 1st aspect), further comprising: retrieving second metadata; instantiating a second guest associated with a second hosting platform of a second project file; loading a second toolchain and a second signature associated with the second project file to the second guest, wherein the second toolchain is determined based on the second metadata; building the second project file into a second executable file; and signing the second executable file with the second signature, resulting in a second certified executable. In accordance with a 14th exemplary aspect of the present disclosure, which may be used in combination with any one or more of the preceding aspects (e.g., the 13th aspect), wherein the first project file and the second project file are two versions of a same product, wherein the first certified executable is configured to execute on the first hosting platform and the second certified executable is configured to execute on the second hosting platform, and wherein the first hosting platform and the second hosting platform are incompatible with each other. In accordance with a 15th exemplary aspect of the present disclosure, which may be used in combination with any one or more of the preceding aspects (e.g., the 13th aspect), wherein the first hosting platform is compatible with the second hosting platform and the second project file is incompatible with the first toolchain.

In accordance with a 16th exemplary aspect of the present disclosure, which may be used in combination with any one or more of the preceding aspects (e.g., the 1st aspect), wherein signing the first executable file includes setting an entitlement file and validating the first signature. In accordance with a 17th exemplary aspect of the present disclosure, which may be used in combination with any one or more of the preceding aspects (e.g., the 1st aspect), wherein signing the first executable file includes debugging the first executable file and memory map aligning the first executable file.

Aspects of the subject matter described herein may be useful alone or in combination with one or more other aspects described herein. In an 18th exemplary aspect of the present disclosure, a method comprises: retrieving first metadata associated with a first project file; instantiating a first guest associated with a first hosting platform of the first project file; loading a first toolchain and a first signature associated with the first project file to the first guest, wherein the first toolchain is determined based on the first metadata; building the first project file into a first executable file; and signing the first executable file with the first signature resulting in a first certified executable.

In accordance with a 19th exemplary aspect of the present disclosure, which may be used in combination with any one or more of the preceding aspects (e.g., the 18th aspect), wherein the first project file is retrieved from a source code storage. In accordance with a 20th exemplary aspect of the present disclosure, which may be used in combination with any one or more of the preceding aspects (e.g., the 19th aspect), wherein the first project file is uploaded to the source code storage via a secure communication channel.

In accordance with a 21st exemplary aspect of the present disclosure, which may be used in combination with any one or more of the preceding aspects (e.g., the 18th aspect), further comprising: storing a plurality of image files including a first image file associated with the first guest and a different second image file. In accordance with a 22nd exemplary aspect of the present disclosure, which may be used in combination with any one or more of the preceding aspects (e.g., the 21st aspect), wherein the first image file includes a first codesign engine associated with the first hosting platform, and the second image file includes a second codesign engine associated with a second hosting platform.

In accordance with a 23rd exemplary aspect of the present disclosure, which may be used in combination with any one or more of the preceding aspects (e.g., the 18th aspect), wherein the first toolchain includes first dependencies of the first project file, which includes a first compiler. In accordance with a 24th exemplary aspect of the present disclosure, which may be used in combination with any one or more of the preceding aspects (e.g., the 18th aspect), wherein the first toolchain is downloaded and installed to the first guest. In accordance with a 25th exemplary aspect of the present disclosure, which may be used in combination with any one or more of the preceding aspects (e.g., the 18th aspect), wherein a first mountable storage has the first toolchain preinstalled, and the first mountable storage is mounted to the first guest. In accordance with a 26th exemplary aspect of the present disclosure, which may be used in combination with any one or more of the preceding aspects (e.g., the 18th aspect), wherein the first certified executable is stored in a secure archive. In accordance with a 27th exemplary aspect of the present disclosure, which may be used in combination with any one or more of the preceding aspects (e.g., the 26th aspect), wherein a retrieval link to the first certified executable is provided to an owner.

In accordance with a 28th exemplary aspect of the present disclosure, which may be used in combination with any one or more of the preceding aspects (e.g., the 18th aspect), wherein the first certified executable is compatible with the first hosting platform and the first executable file is incompatible with the first hosting platform. In accordance with a 29th exemplary aspect of the present disclosure, which may be used in combination with any one or more of the preceding aspects (e.g., the 18th aspect), wherein the first certified executable is transferred off of the first guest, and then the first guest is terminated and storage used by the first guest securely deleted.

In accordance with a 30th exemplary aspect of the present disclosure, which may be used in combination with any one or more of the preceding aspects (e.g., the 18th aspect), further comprising: retrieving a second metadata; instantiating a second guest associated with a second hosting platform of a second project file; loading a second toolchain and a second signature associated with the second project file to the second guest, wherein the second toolchain is determined based on the second metadata; building the second project file into a second executable file; and signing the second executable file with the second signature, resulting in a second certified executable. In accordance with a 31st exemplary aspect of the present disclosure, which may be used in combination with any one or more of the preceding aspects (e.g., the 30th aspect), wherein the first project file and the second project file are two versions of a same product, wherein the first certified executable is configured to execute on the first hosting platform and the second certified executable is configured to execute on the second hosting platform, and wherein the first hosting platform and the second hosting platform are incompatible with each other. In accordance with a 32nd exemplary aspect of the present disclosure, which may be used in combination with any one or more of the preceding aspects (e.g., the 30th aspect), wherein the first hosting platform is compatible with the second hosting platform and the second project file is incompatible with the first toolchain.

In accordance with a 33rd exemplary aspect of the present disclosure, which may be used in combination with any one or more of the preceding aspects (e.g., the 18th aspect), wherein signing the first executable file includes setting an entitlement file and validating the first signature. In accordance with a 34th exemplary aspect of the present disclosure, which may be used in combination with any one or more of the preceding aspects (e.g., the 18th aspect), wherein signing the first executable file includes debugging the first executable file and memory map aligning the first executable file.

Aspects of the subject matter described herein may be useful alone or in combination with one or more other aspects described herein. In a 35th exemplary aspect of the present disclosure, a system comprise: a means for retrieving first metadata associated with a first project file; a means for instantiating a first guest associated with a first hosting platform of the first project file; a means for loading a first toolchain and a first signature associated with the first project file to the first guest, wherein the first toolchain is determined based on the first metadata; a means for building the first project file into a first executable file; and a means for signing the first executable file with the first signature resulting in a first certified executable.

Aspects of the subject matter described herein may be useful alone or in combination with one or more other aspects described herein. In a 36th exemplary aspect of the present disclosure, a computer-readable non-transitory storage medium storing executable instructions, which when executed by a computer system, cause the computer system to: retrieve first metadata associated with a first project file; instantiate a first guest associated with a first hosting platform of the first project file; load a first toolchain and a first signature associated with the first project file to the first guest, wherein the first toolchain is determined based on the first metadata; build the first project file into a first executable file; and sign the first executable file with the first signature resulting in a first certified executable.

Aspects of the subject matter described herein may be useful alone or in combination with one or more other aspects described herein. In a 37th exemplary aspect of the present disclosure, a system comprises: a memory communicatively coupled to one or more processors; and a first guest, including a codesign engine, configured to execute on the one or more processors, executing to: load a toolchain associated with a first project file; build the first project file with the toolchain into a first application; sign, by the codesign engine, the first application with a first signature resulting in a first certified application, wherein the first signature is associated with the first project file; and output, the first certified application to a secure storage.

In accordance with a 38th exemplary aspect of the present disclosure, which may be used in combination with any one or more of the preceding aspects (e.g., the 37th aspect), wherein a different second guest produces a different second certified application from a second project file. In accordance with a 39th exemplary aspect of the present disclosure, which may be used in combination with any one or more of the preceding aspects (e.g., the 38th aspect), wherein the second project file requires at least one of a different toolchain and a different codesign engine.

In accordance with a 40th exemplary aspect of the present disclosure, which may be used in combination with any one or more of the preceding aspects (e.g., the 37th aspect), wherein the first guest is instantiated based on the first project file being committed to a software configuration management system. In accordance with a 41st exemplary aspect of the present disclosure, which may be used in combination with any one or more of the preceding aspects (e.g., the 40th aspect), wherein committing the first project file to the software configuration management system requires authenticating through a first authentication system, and modifying the first signature requires authenticating through a different second authentication system.

Aspects of the subject matter described herein may be useful alone or in combination with one or more other aspects described herein. In a 42nd exemplary aspect of the present disclosure, a method comprises: loading a toolchain associated with a first project file; building the first project file with the toolchain into a first application; signing the first application with a first signature resulting in a first certified application, wherein the first signature is associated with the first project file; and outputting the first certified application to a secure storage.

In accordance with a 43rd exemplary aspect of the present disclosure, which may be used in combination with any one or more of the preceding aspects (e.g., the 42nd aspect), wherein a different second guest produces a different second certified application from a second project file. In accordance with a 44th exemplary aspect of the present disclosure, which may be used in combination with any one or more of the preceding aspects (e.g., the 43rd aspect), wherein the second project file requires at least one of a different toolchain and a different codesign engine.

In accordance with a 45th exemplary aspect of the present disclosure, which may be used in combination with any one or more of the preceding aspects (e.g., the 42nd aspect), wherein the first guest is instantiated based on the first project file being committed to a software configuration management system. In accordance with a 46th exemplary aspect of the present disclosure, which may be used in combination with any one or more of the preceding aspects (e.g., the 45th aspect), wherein committing the first project file to the software configuration management system requires authenticating through a first authentication system, and modifying the first signature requires authenticating through a different second authentication system.

Aspects of the subject matter described herein may be useful alone or in combination with one or more other aspects described herein. In a 47th exemplary aspect of the present disclosure, a system comprises: a means for loading a toolchain associated with a first project file; a means for building the first project file with the toolchain into a first application; a means for signing the first application with a first signature resulting in a first certified application, wherein the first signature is associated with the first project file; and a means for outputting the first certified application to a secure storage.

Aspects of the subject matter described herein may be useful alone or in combination with one or more other aspects described herein. In a 48th exemplary aspect of the present disclosure, a computer-readable non-transitory storage medium storing executable instructions, which when executed by a computer system, cause the computer system to: load a toolchain associated with a first project file; build the first project file with the toolchain into a first application; sign the first application with a first signature resulting in a first certified application, wherein the first signature is associated with the first project file; and output the first certified application to a secure storage.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a first project file associated with first metadata;
a memory communicatively coupled with one or more processors executing to:
retrieve the first metadata;
instantiate a first guest associated with a first hosting platform of the first project file;
load a first toolchain and a first signature associated with the first project file to the first guest, wherein the first toolchain is determined based on the first metadata;
build the first project file into a first executable file;
sign the first executable file with the first signature resulting in a first certified executable;
retrieve second metadata;
instantiate a second guest associated with a second hosting platform of a second project file;
load a second toolchain and a second signature associated with the second project file to the second guest, wherein the second toolchain is determined based on the second metadata;
build the second project file into a second executable file; and
sign the second executable file with the second signature, resulting in a second certified executable, wherein the first project file and the second project file are two versions of a same product, wherein the first certified executable is configured to execute on the first hosting platform and the second certified executable is configured to execute on the second hosting platform, and wherein the first hosting platform and the second hosting platform are incompatible with each other.

2. The system of claim 1, further comprising:
a source code storage, wherein the first project file is retrieved from the source code storage and, wherein the first project file is uploaded to the source code storage via a secure communication channel.

3. The system of claim 1, wherein a first image file includes a first codesign engine associated with the first hosting platform, and a second image file includes a second codesign engine associated with the second hosting platform.

4. The system of claim 1, wherein the first toolchain includes first dependencies of the first project file, which includes a first compiler.

5. The system of claim 1, wherein the first toolchain is downloaded and installed to the first guest.

6. The system of claim 1, wherein a first mountable storage has the first toolchain preinstalled, and the first mountable storage is mounted to the first guest.

7. The system of claim 1, further comprising:
a secure archive, wherein the first certified executable is stored in the secure archive and, wherein a retrieval link to the first certified executable is provided to an owner.

8. The system of claim 1, wherein the first certified executable is compatible with the first hosting platform and the first executable file is incompatible with the first hosting platform.

9. The system of claim 1, wherein the first certified executable is transferred off of the first guest, and then the first guest is terminated and storage used by the first guest securely deleted.

10. The system of claim 1, wherein the second project file is incompatible with the first toolchain.

11. The system of claim 1, wherein signing the first executable file includes setting an entitlement file and validating the first signature.

12. The system of claim 1, wherein signing the first executable file includes debugging the first executable file and memory map aligning the first executable file.

13. A method comprising:
retrieving first metadata associated with a first project file;
instantiating a first guest associated with a first hosting platform of the first project file;
loading a first toolchain and a first signature associated with the first project file to the first guest, wherein the first toolchain is determined based on the first metadata;
building the first project file into a first executable file;
signing the first executable file with the first signature, resulting in a first certified executable;
retrieving second metadata;
instantiating a second guest associated with a second hosting platform of a second project file;
loading a second toolchain and a second signature associated with the second project file to the second guest, wherein the second toolchain is determined based on the second metadata;
building the second project file into a second executable file; and
signing the second executable file with the second signature, resulting in a second certified executable, wherein the first project file and the second project file are two versions of a same product, wherein the first certified executable is configured to execute on the first hosting platform and the second certified executable is configured to execute on the second hosting platform, and wherein the first hosting platform and the second hosting platform are incompatible with each other.

14. A system comprising:
a memory communicatively coupled to one or more processors;
a first guest including a first codesign engine, wherein the first guest is implemented in software and is configured to execute on the one or more processors to:
load a first toolchain associated with a first project file;
build the first project file with the first toolchain into a first application;
sign, by the first codesign engine, the first application with a first signature resulting in a first certified application, wherein the first signature is associated with the first project file; and
output, the first certified application to a first secure storage; and
a second guest including a second codesign engine, wherein the second guest is implemented in software and is configured to execute on the one or more processors to:
load a second toolchain associated with a second project file;
build the second project file with the second toolchain into a second application;
sign, by the second codesign engine, the second application with a second signature resulting in a second certified application, wherein the second signature is associated with the second project file; and
output, the second certified application to a second secure storage,
wherein the first project file and the second project file are two versions of a same product, wherein the first certified executable is configured to execute on the first hosting platform and the second certified executable is configured to execute on the second hosting platform, and wherein the first hosting platform and the second hosting platform are incompatible with each other.

15. The system of claim 14, wherein the first project file and the second project file are the same project file.

16. The system of claim 14, wherein the second project file requires at least one of the second toolchain and the second codesign engine.

17. The system of claim 14, wherein the first guest is instantiated based on the first project file being committed to a software configuration management system.

18. The system of claim 17, wherein committing the first project file to the software configuration management system requires authenticating through a first authentication system, and modifying the first signature requires authenticating through a different second authentication system.

19. The system of claim 14, wherein the first toolchain and the second toolchain are different toolchains such that at least one of the first toolchain and the second toolchain includes an additional component relative to the other one of the first toolchain and the second toolchain.

* * * * *